Patented Apr. 17, 1934

1,954,960

UNITED STATES PATENT OFFICE 1,954,960

METHOD OF JOINING THERMOPLASTIC INSULATION

Ernst Studt, Nordenham-on-the-Weser, Germany, Archie R. Kemp, Westwood, N. J., and Frank S. Malm, Chicago, Ill.; said Studt assignor to Felten and Guilleaume Carlswerk, A. G., Cologne-Mulheim, Germany, a corporation of Germany, and said Kemp and Malm assignors to Bell Telephone Laboratories, Incorporated, New York, N. Y., a corporation of New York No Drawing. Application October 17, 1931, Serial No. 569,538. In Great Britain October 30, 1930

3 Claims. (Cl. 173—268)

This invention relates to methods of joining thermo-plastic materials, such, for example, as gutta percha and compositions of gutta percha, rubber, balata or the like with or without the addition of waxes and other materials, and more particularly to methods of making joints in thermo-plastic insulation of submarine electric cables such as signalling cables.

According to the present invention a method of joining the insulation of cable cores insulated with such thermo-plastic materials comprises applying to the surfaces to be joined steam or water vapor to raise the temperature thereof and thereafter bringing the surfaces so treated into contact with one another, preferably but not necessarily without the interposition of a vulcanizing agent, accelerator, or adhesive, such as rubber solution.

Preferably the thermo-plastic material used for and adjacent the joint is prepared in such manner that it contains a greater proportion of water than the proportion of water contained by the main body of the thermo-plastic material. For example, the main bulk of the thermo-plastic material in the case of thermo-plastic insulation of a submarine electric signalling cable may contain about 0.75% by weight of water, whereas the water content of the thermo-plastic material adjacent the joint may be increased conveniently to 1.5%, 1.8% or even 3%. An increase in the water content of the material adjacent the joint will generally result in a stronger and better joint.

Furthermore, after the surfaces to be joined are brought into contact the surrounding material is preferably masticated or worked in order to secure more intimate contact and better cohesion. Instead of, or as well as, masticating the material adjacent the joint, the joint may be subjected to heat and pressure, preferably gradually applied, by means of a mold which latter may be heated by steam or electricity or in other convenient manner.

The invention has been found particularly applicable to joining the insulation of submarine cables when the insulation is a mixture of about 40% deresinated balata, about 40% deproteinized rubber and about 10% wax.

For the better understanding of the invention, the manufacture of a joint in a submarine electric signalling cable insulated with thermo-plastic material of the nature set forth will now be described by way of example only.

In preparation for the joint the thermo-plastic insulating material at the ends of the continuously loaded cable cores, that is, the electrical conductors sheathed with thermo-plastic insulating material, is removed for a distance of some seven inches or eight inches from the end of each core in known manner. The conductors are then scarfed, soldered and wound with magnetic loading material and whipped in the usual manner to form a good electrical and mechanical joint.

Thereafter the thermo-plastic material near the end of one core is heated over a length of about five inches by applying to it a jet or a plurality of jets, blasts of steam or heated water vapor for a period of about three minutes whereby the material is rendered plastic. The jets may be arranged circumferentially about the core or longitudinally therealong or both. Any suitable other means may be employed to apply the steam. The condensed water is then removed from the surface of the heated thermo-plastic material by means of warm air directed thereon from an air blower. The thermo-plastic material is then tapered down by hand or by a tool to make a symmetrical cone free from twists and extending approximately two-thirds of the length of the conductor joint. Preferably the portion of the conductor to be covered by this core is previously smeared with an adhesive composition such as Chatterton's compound or one of the lately developed improved substitutes therefor. Any excess thermo-plastic material is thereafter twisted off from the tip of the taper. The taper is then thoroughly cleaned all over its surface either by chemical means or preferably by filing, whereafter it is essential that the surface of the tapered thermo-plastic material should not be touched by hand or contaminated in any other way.

The thermo-plastic material at the end of the second core is now treated in the same manner as described for the first and is tapered down so as to overlap the first taper for a distance of about one inch. The excess of thermo-plastic material at the tip of the second taper is allowed to remain. The overlapping portions of the two tapers with the excess material may now be masticated with a tool consisting, for example, of two hinged concave and toothed jaws. Instead of masticating or in addition to masticating, the overlapping portion of the tapered ends together with the excess thermo-plastic material are treated under heat and pressure in a mold. The mold is made according to the usual practice in two halves and may conveniently be heated by electricity. Two halves of the mold are lined with tinfoil, preferably approximately 0.005 inch in thickness and preferably preshaped to fit the mold. The thermo-plastic material on each side of the portion which will be covered by the mold is wrapped for a distance of approximately six inches with a clean chamois skin moistened with distilled water. Prior to the application of the mold the surfaces of the thermo-plastic material at the end of the overlap are filed or otherwise cleaned for a distance of about one half inch. The mold is applied to the overlapped portion and is heated to and maintained at a temperature of 120° C. plus or minus 5° C. Pressure is gradually applied to the mold, thus gradually bringing the two parts of the mold together and squeezing out excess thermo-plastic material. A pressure rising to 14 lbs. per square inch applied during a total time of ten minutes is found satisfactory.

The mold is removed and the joint is cooled in air with the tinfoil adhering to the surface for some ten minutes and is then finally cooled in distilled water. The tinfoil is then removed and the fin caused by the flow of excess thermo-plastic material from the joints of the mold is removed with a sharp knife. The molded surface, and the whole surface of the two tapers is thoroughly cleaned either chemically or preferably by filing and any adhering particles are removed by means of clean pincers.

The next step in the joint is to complete the proper thickness of thermo-plastic material by extruding over the joint and tapered portions further thermo-plastic material. For this purpose a machine of the type described in United States Patent No. 1,583,815 is prepared by charging it with thermo-plastic material and raising its temperature to about 102° to 104° C. The thermo-plastic material is well masticated in the machine for about ten minutes. Thereafter the covering die and prepared joint are placed in the machine and properly centered therein. The jointed cable is traversed through the machine at a uniform rate such that the joint will be completely covered with fresh thermo-plastic material in about 12 to 13 minutes, the temperature being maintained at 102° C. to 104° C.

The thermo-plastic material used for jointing should be in such condition that its moisture content is not less than 0.8% and preferably not more than 2.5% when determined from samples taken during the extrusion at the middle portion of the joint.

It will be appreciated that the above description of the manufacture of a joint is given by way of example only and that modifications may be made which will nevertheless take advantage of the new principles herein set forth.

In accordance with the prior art the plastic insulation has been heated with an alcohol or spirit lamp preliminary to making a joint. This resulted in drying out the material and making it non-plastic or poorly plastic as well as in overheating it in spots. All of these difficulties are avoided by the present method. The use of vulcanizing agents, vulcanizing processes, accelerators or adhesives between the surfaces of the insulation are avoided. The joints made by the present method are vastly better than those made heretofore.

What is claimed is:

1. A method of jointing the insulation of cable cores insulated with thermo-plastic materials, such as gutta percha and compositions containing gutta percha, India rubber, balata or the like with or without the addition of other materials such as waxes, which includes heating the surfaces to be jointed and thereafter bringing them into contact, preferably but not necessarily without the interposition of a vulcanizing agent, accelerator or adhesive, such as rubber solution, characterized in that the heating is effected by applying to the surfaces steam or water vapor.

2. A method of jointing cable cores insulated with thermo-plastic materials according to claim 1 characterized in that the thermo-plastic material adjacent the joint is prepared in such manner as to contain a greater proportion, e. g. 1.5% to 3% by weight, of water than the proportion of water, e. g. 0.75% by weight, contained by the main body of thermo-plastic material.

3. A method of jointing thermo-plastic materials according to claim 1 characterized in that, after the surfaces are brought into contact, the adjacent material is masticated or worked to secure more intimate contact and better adhesion.

ERNST STUDT.
ARCHIE R. KEMP.
FRANK S. MALM.